US012751441B2

(12) United States Patent
Chalfant et al.

(10) Patent No.: US 12,751,441 B2
(45) Date of Patent: Oct. 6, 2026

(54) FISHING HOOK REMOVER AND VENT TOOL

(71) Applicant: Smith's Consumer Products, Inc., Hot Springs, AR (US)

(72) Inventors: Louis Chalfant, Hot Springs, AR (US); Ricky L. Dukes, Knoxville, TN (US)

(73) Assignee: Good Sportsman Marketing, L.L.C., Irving, TX (US)

( * ) Notice: Subject to any disclaimer, the term of this patent is extended or adjusted under 35 U.S.C. 154(b) by 0 days.

(21) Appl. No.: 18/597,189

(22) Filed: Mar. 6, 2024

(65) Prior Publication Data

US 2025/0280814 A1 Sep. 11, 2025

(51) Int. Cl.
*A01K 97/18* (2006.01)

(52) U.S. Cl.
CPC .................................... *A01K 97/18* (2013.01)

(58) Field of Classification Search
CPC ...................................................... A01K 97/18
See application file for complete search history.

(56) References Cited

U.S. PATENT DOCUMENTS 253,363 A * 2/1882 Foard ..................... A01K 97/18 43/53.5
4,127,957 A * 12/1978 Bourquin ............... A01K 97/18 43/53.5
6,840,002 B1 * 1/2005 Dick ...................... A01K 97/18 43/53.5
7,676,982 B1 * 3/2010 Lee ........................ A01K 97/00 43/53.5
7,856,751 B1 * 12/2010 Moncrief ............... A01K 97/00 43/53.5
2004/0025408 A1 * 2/2004 Newman, Sr. ......... A01K 97/18 43/53.5
2009/0149836 A1 * 6/2009 Teachout ................. A61D 1/14 119/200
2010/0000141 A1 * 1/2010 Cooksey ................ A01K 97/00 43/4
2010/0005698 A1 * 1/2010 Raus ...................... A01K 97/00 43/4

OTHER PUBLICATIONS

"How to Unhook A Catfish (Without Ever Touching It)," https://www.youtube.com/watch?v=J70D4PSvxI8 (last accessed Feb. 14, 2024).
"Fishing Venting & Release!," https://www.youtube.com/watch?v=bng2tRz9O7s (last accessed Feb. 14, 2024).

* cited by examiner

*Primary Examiner* — Richard G Davis
(74) *Attorney, Agent, or Firm* — D'Ambrosio & Menon, PLLC; Usha Menon

(57) ABSTRACT

A fishing hook remover and vent tool is disclosed. The tool includes a handle having a first end and a second end, a hook remover connected to the first end of said handle, and a vent needle assembly. The vent needle assembly includes a handle insert positioned in an internal compartment of the handle and a slidable needle assembly positioned in the interior of the handle insert. The slidable needle assembly includes a vent needle, which is slidable in and out of the second end of the handle.

13 Claims, 6 Drawing Sheets

FISHING HOOK REMOVER AND VENT TOOL

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

Fishermen must be prepared for many situations that they may encounter while fishing, so it is common for fishing tackle boxes to be packed full of fishing supplies and gadgets. But tackle box space is at a premium, so small tools capable of performing different tasks are preferred. One challenge faced by nearly all of fishermen is safely removing the fishing hook from the mouth of the fish. In some instances, the fisherman may desire to remove the hook without touching the fish to prevent injury to himself or the fish. To overcome this challenge, some fishermen keep a dehooking or hook remover device in their tackle box. Another challenge faced by some fishermen is the need to release or vent gases out of the swim bladder of fish caught at depth before the fish are released. In these situations, if the gases in the swim bladder are not released, then the fish will be prevented from returning quickly to depth and may die as a result. Inserting a hypodermic needle into the swim bladder is a common method for releasing the gases, but the needle can easily be damaged in a tackle box and the fishermen risks pricking himself with the sharp needle left in the tackle box.

It would therefore be desirable to develop a tool that can be used to both remove the fishing hook from the mouth of the fish and to vent the fish. It would also be desirable for the vent needle to be stowed in the tool when it is not in use to prevent damage to the needle and injury to the fisherman.

BRIEF SUMMARY OF THE INVENTION

The present invention is directed to a fishing hook remover and vent tool. The tool includes a handle having a first end and a second end, a fishing hook remover connected to the first end of the handle, and a fishing vent needle assembly. The vent needle assembly includes a handle insert positioned in an internal compartment of the handle and a slidable needle assembly positioned in the interior of the handle insert. The slidable needle assembly comprises a vent needle, which is slidable in and out of the second end of the handle.

These and other features, objects and advantages of the present invention will become better understood from a consideration of the following detailed description of the preferred embodiments and appended claims in conjunction with the drawings as described following:

DETAILED DESCRIPTION OF THE INVENTION

Figure 1:
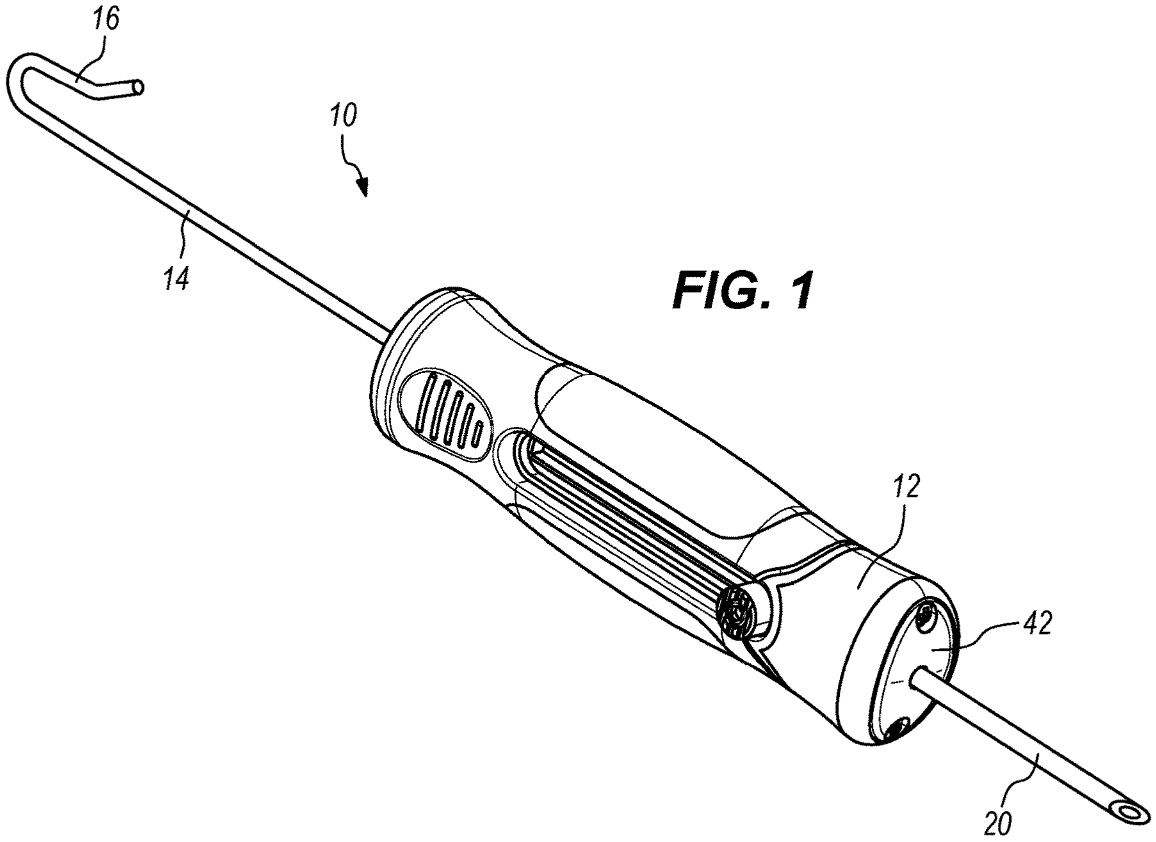
FIG. 1 is a top perspective view of the fishing hook remover and vent tool of the present invention.
Figure 2:
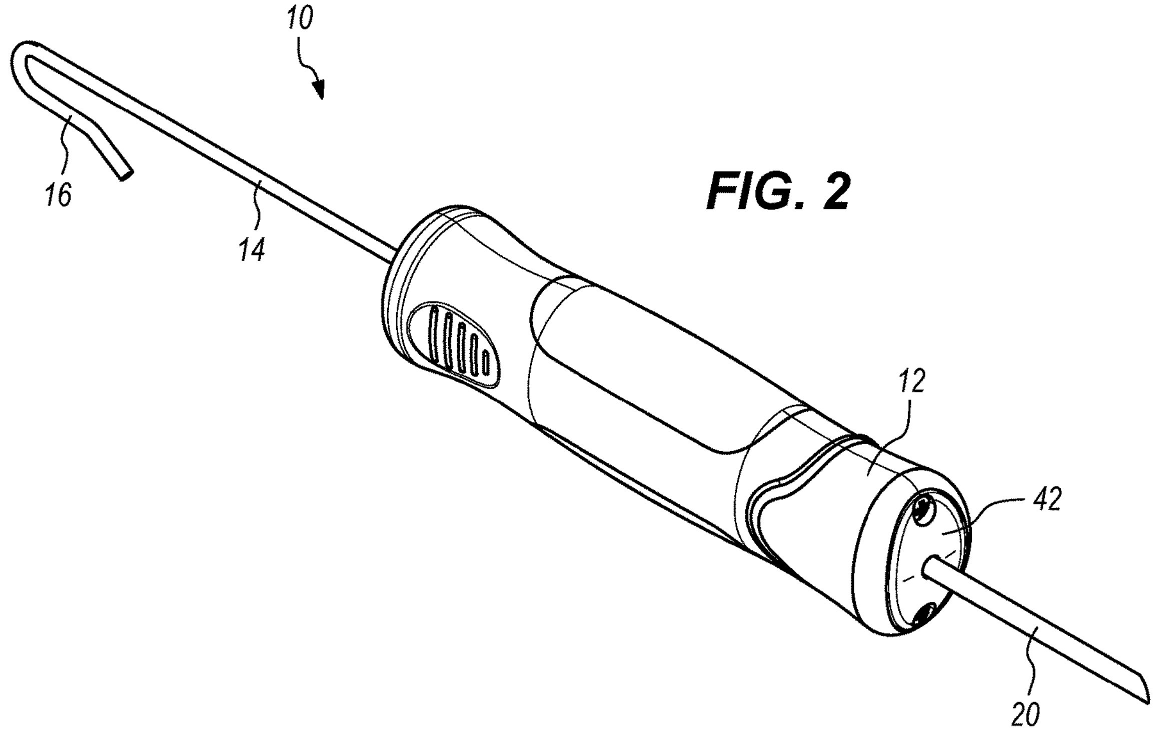
FIG. 2 is a bottom perspective view of the fishing hook remover and vent tool of the present invention.
Figure 3:
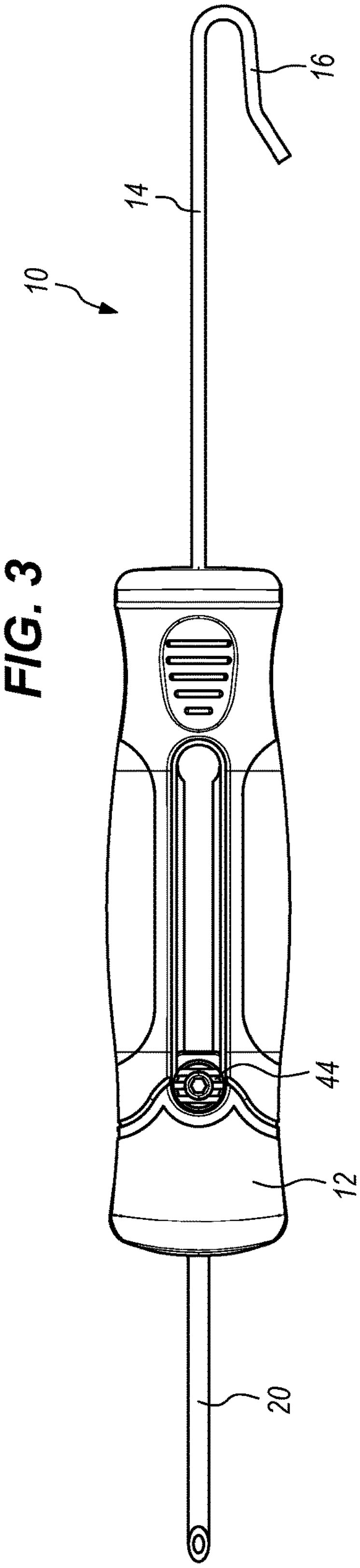
FIG. 3 is a top view of the fishing hook remover and vent tool of the present invention with the vent needle in the open position.
Figure 4:
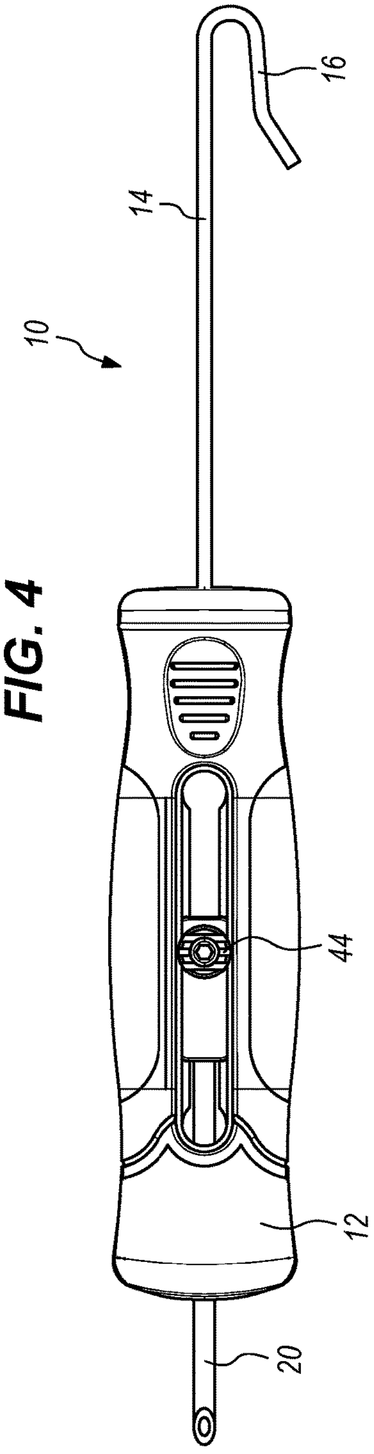
FIG. 4 is a top view of the fishing hook remover and vent tool of the present invention with the vent needle transitioning between the open position and the closed position.

With reference to FIGS. 1-15, the preferred embodiments of the present invention may be described. The fishing hook remover and vent tool 10 of the present invention includes a handle 12 with a hook remover 14 connected to one end of the handle 12 and a vent needle 20 slidably connected to the other opposite end of the handle 12, as shown in FIGS. 1-2.

Figure 6:
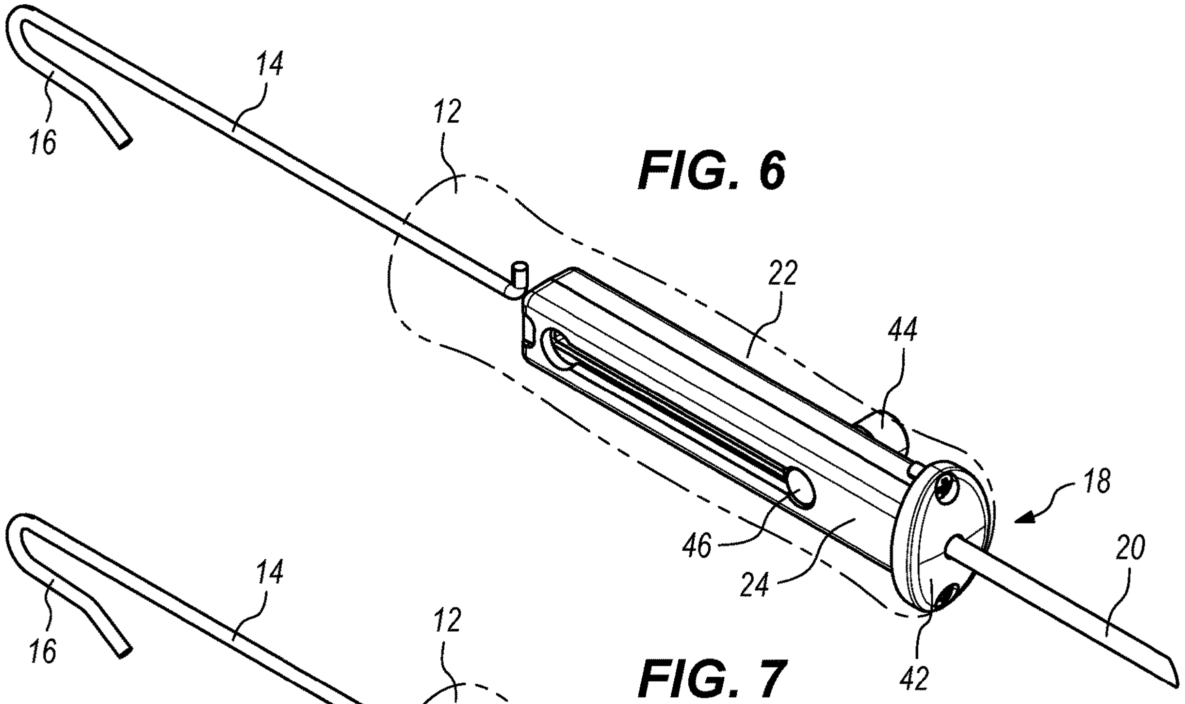
FIG. 6 is a bottom perspective view of the fishing hook remover and vent tool of the present invention with the vent needle in the open position and the handle in outline.
Figure 7:
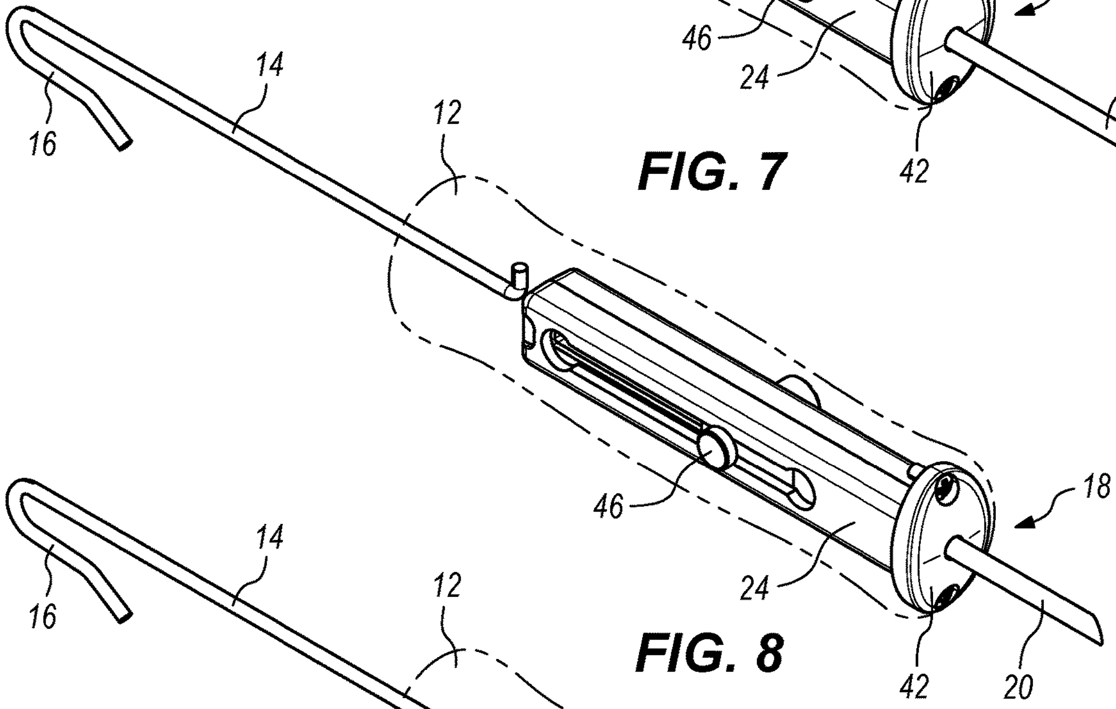
FIG. 7 is a bottom perspective view of the fishing hook remover and vent tool of the present invention with the vent needle transitioning between the open position and the closed position and the handle in outline.
Figure 8:
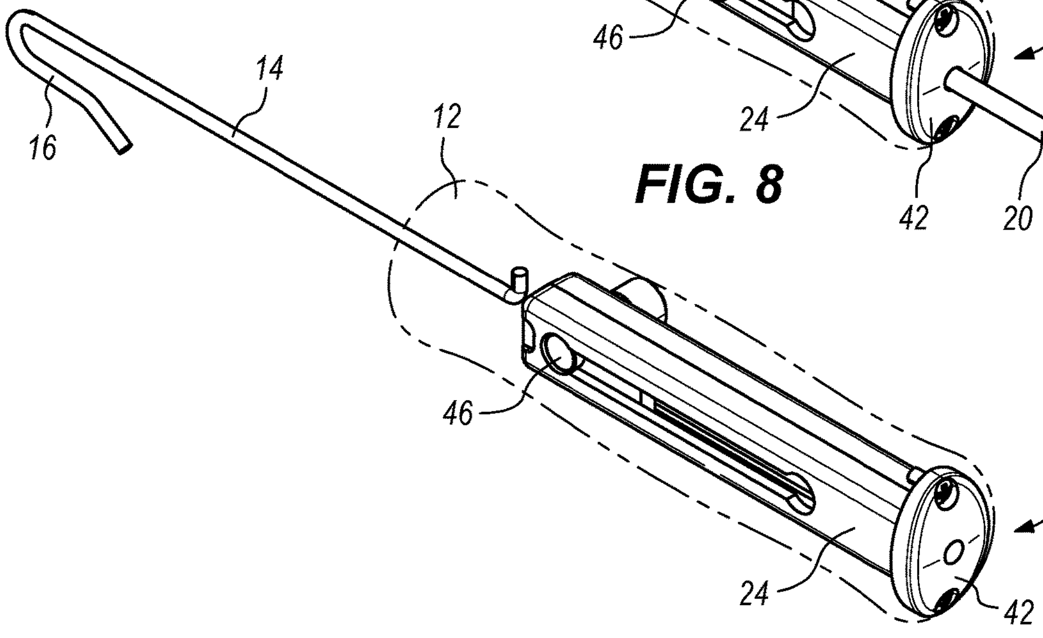
FIG. 8 is a bottom perspective view of the fishing hook remover and vent tool of the present invention with the vent needle in the closed position and the handle in outline.
Figure 9:
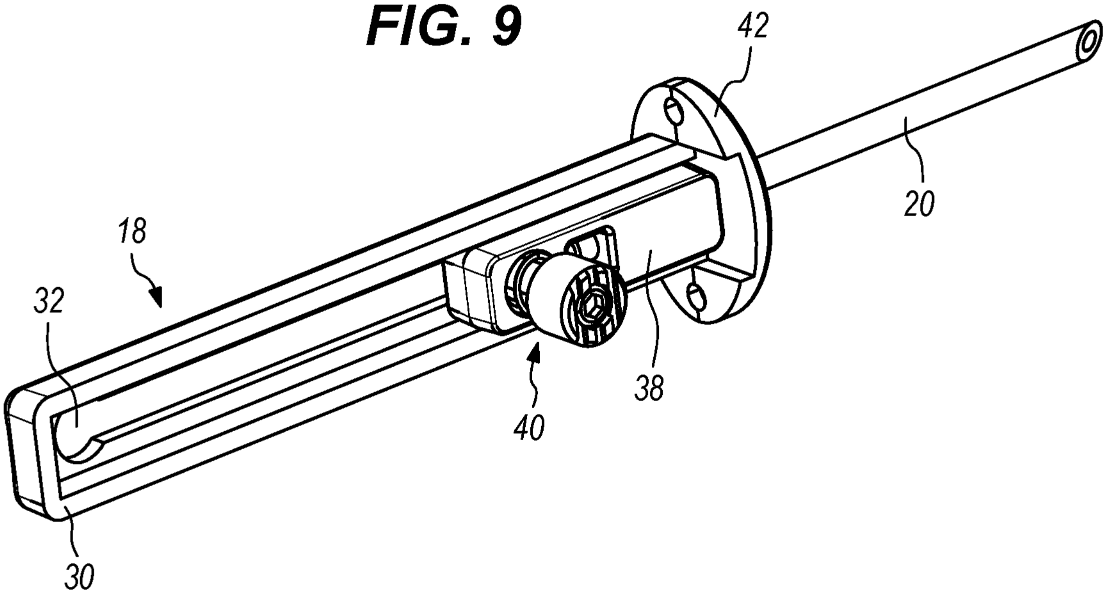
FIG. 9 is a top perspective view of the vent needle assembly of the fishing hook remover and vent tool of the present invention with the top plate omitted.
Figure 10:
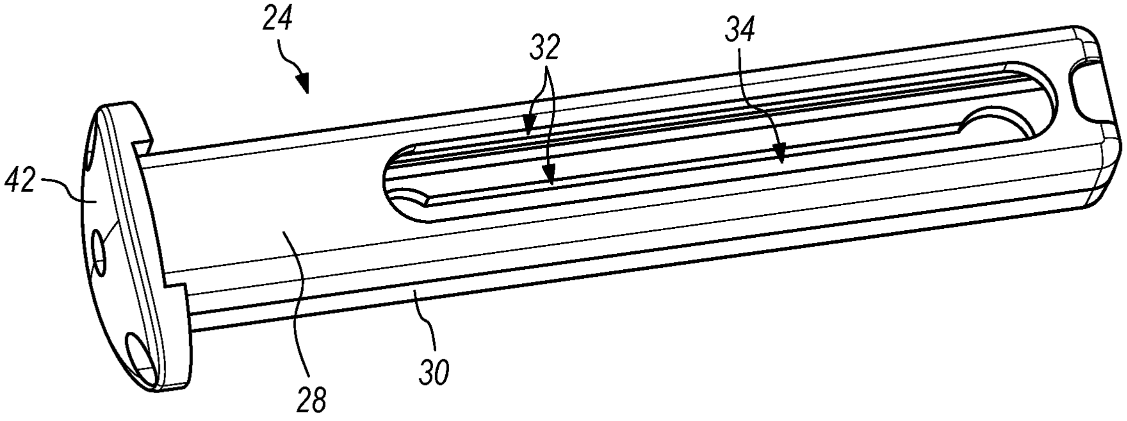
FIG. 10 is a top perspective view of the handle insert of the fishing hook remover and vent tool of the present invention with the slidable needle assembly omitted.

The handle 12 of the tool 10 is used for grasping the tool. The handle 12 preferably includes an open internal compartment 22. One end of the handle includes an opening that receives one end of the hook remover 14. In one embodiment, the hook remover 14 is preferably an austenitic or martensitic steel rod, but it should be understood that other strong and durable materials may alternatively be used. One end of the hook remover 14 is bent at approximately a 90 degree angle to prevent the hook remover 14 from being removed from the opening in the handle 12, as shown in FIGS. 6-8. At the opposite end, the hook remover 14 includes a hook end 16 at the end opposite of the handle 12. The hook remover 14 extends away from the end of the handle 12 before forming the hook end 16. The hook end is formed by the rod curving back towards the handle. The terminal end portion of the rod is angled at approximately 45-degrees from the adjacent portion of the rod that extends back towards the end of the handle 12.

Figure 15:
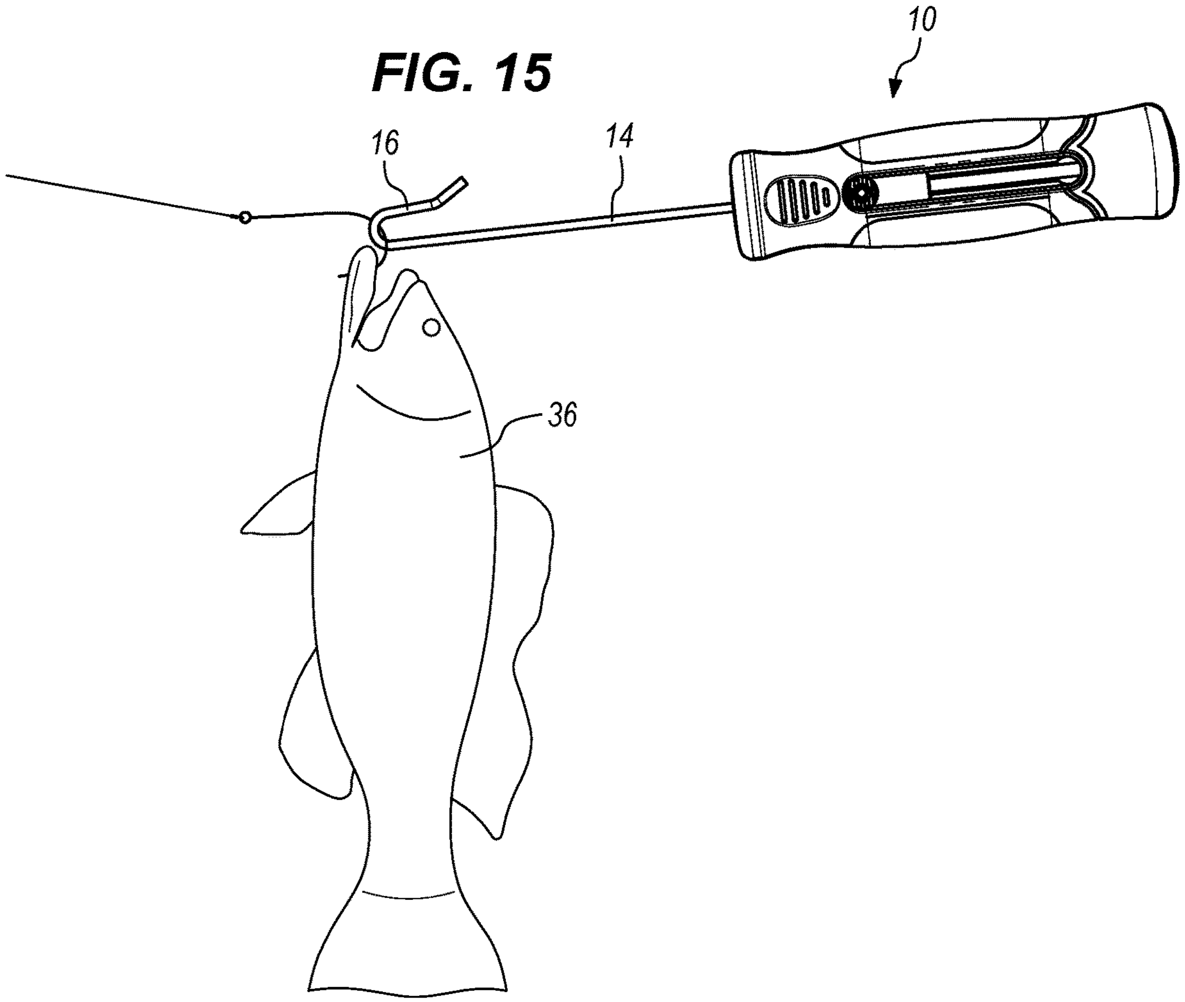
FIG. 15 is a perspective view of a caught fish with the hook in the caught fish's mouth interlocked with the hook remover of the fishing hook remover and vent tool of the present invention.

In use, while holding the fishing line attached to the caught fish 36 with one hand, the fisherman uses his other hand to interlock the fishing hook in the fish's mouth with the hook end 16 of the hook remover of the tool 10, as shown in FIG. 15. By rotating the handle 12 of the tool 10 and thus rotating the hook end 16 of the hook remover 14, the fisherman is able to rotate the fishing hook in the fish's mouth. The handle 12 of the tool 10 is rotated until the fishing hook in the fish's mouth is facing downward. As a result, the fish falls off of the fishing hook. In some circumstances, the fisherman may softly jiggle the handle 10 to aid the fish sliding off the hook.

Figure 14:
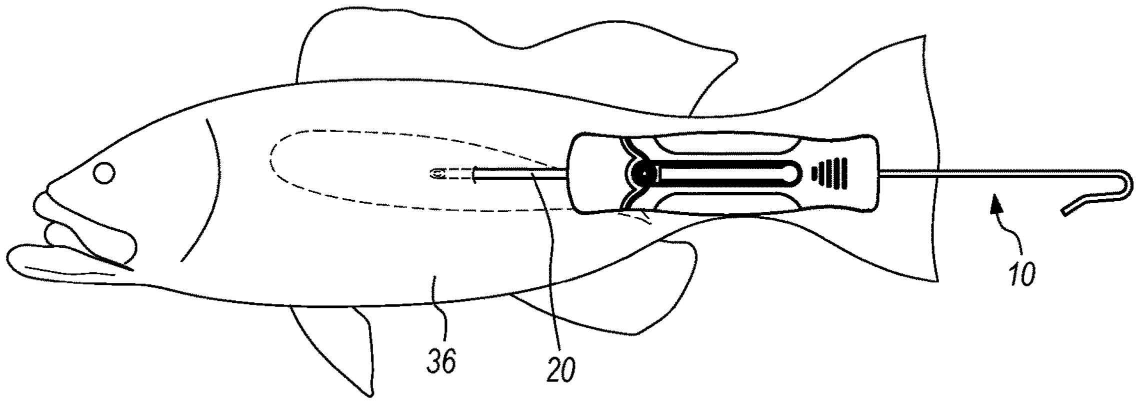
FIG. 14 is a perspective view of a fish with the swim bladder of the fish being punctured by the vent needle of the fishing hook remover and vent tool of the present invention.

The tool 10 includes a vent needle assembly 18. The vent needle assembly 18 of the tool includes the vent needle 20 that is used by fishermen to release or vent gases out of the swim bladder of fish caught at depth before they are released, as shown in FIG. 14. The vent needle 20 is slidable into the internal compartment 22 of the handle 12 for stowing and slidable out of the handle 12 when the vent needle 20 is being used. Stowing the needle 20 prevents damage to the needle and potential injury to the fisherman.

Figure 11:
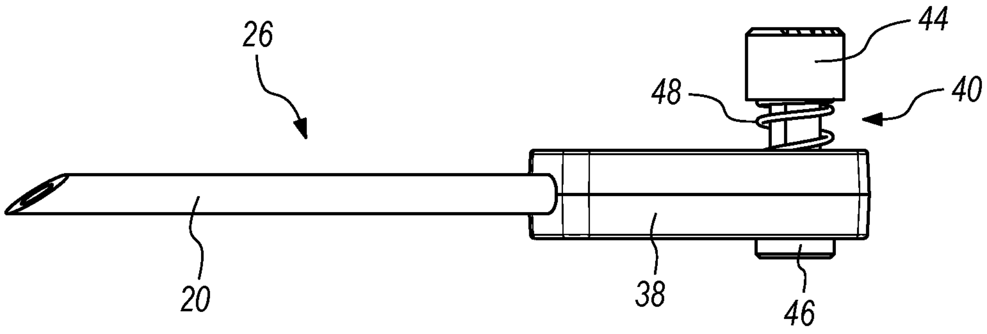
FIG. 11 is a side view of the slidable needle assembly of the fishing hook remover and vent tool of the present invention.
Figure 12:
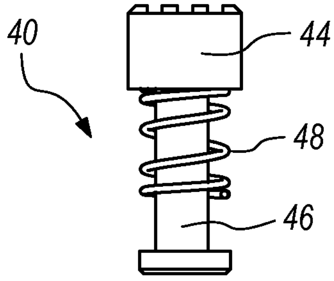
FIG. 12 is a side view of the push button of the fishing hook remover and vent tool of the present invention.
Figure 13:
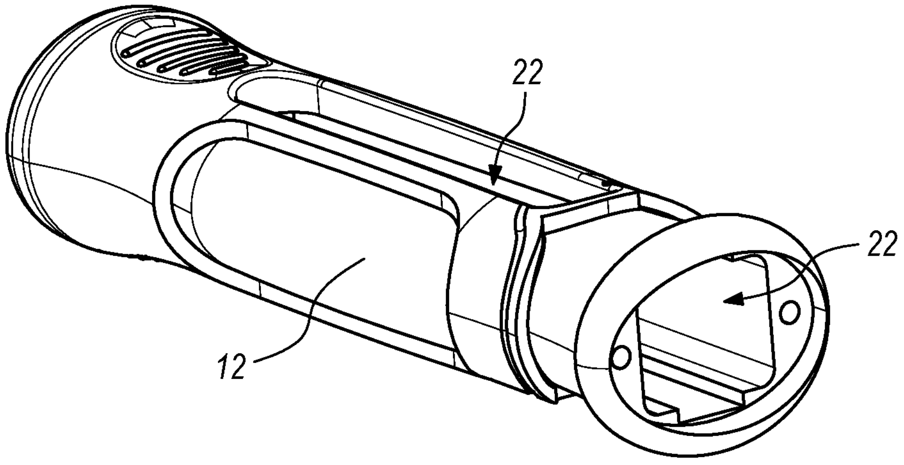
FIG. 13 is a top perspective view of the handle of the fishing hook remover and vent tool of the present invention with the handle insert and the slidable needle assembly omitted.

The vent needle assembly 18 includes a handle insert 24 and a slidable needle assembly 26. The slidable needle assembly 26 includes the needle 20, a connector 38, and a push button 40. The needle 20 has a pointed end and a non-pointed end. The non-pointed end is received by the connector 38. In the preferred embodiment, the non-pointed end is received through an opening in the side of the connector 38, as shown in FIG. 11. The pointed end of the needle 20 therefore extends away from the connector 38. The push button 40 includes a thumb press 44, a rod 46, and a spring 48. The spring 48 surrounds the rod 46, and the rod 46 passes through a vertically-oriented opening in the connector 38, as shown in FIG. 11. The thumb press 44 fits on top of the rod 46 that is positioned outside of the top of the connector 38. The bottom end of the rod 46 has a larger diameter than the opening in the connector 38 to prevent the rod from being removed from the top of the connector 38.

The handle insert 24, which is positioned in the open internal compartment 22 of the handle 12, includes a top plate 28 and a bottom plate 30. The top plate 28 and the bottom plate 30 are connected along their perimeter. Each of the top plate 28 and the bottom plate 30 includes a slot that extends a portion of the length of the plate. The slot of the top plate 28 is a long oval shape, as shown in FIGS. 3-5 and 10. The slot of the bottom plate 30 is elongated with the ends being rounded, as shown in FIGS. 6-8 and 10. The slots 32 of the top plate 28 and the bottom plate 30 are aligned to form a track 34. A portion of the rod of the needle assembly 26 is slidable in the track 34 of the handle insert 24. The end of the handle insert 24 includes an end plate 42. The end plate 42 closes the end of the internal compartment 22 in the handle 12. In one embodiment, the end plate 42 is fastened to the end of the handle 12 with fasteners, such as screws.

Figure 5:
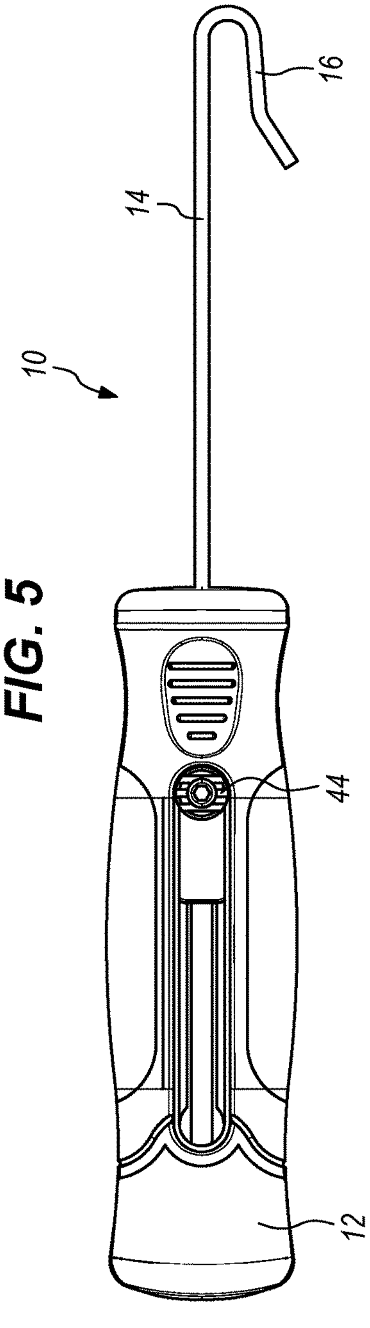
FIG. 5 is a top view of the fishing hook remover and vent tool of the present invention with the vent needle in the closed position.

Moving the slidable needle assembly 26 within the track 34 moves the vent needle 20 from the closed or stowed position in the handle 12 to the open or usable position outside of the handle 12. When the vent needle 20 is in the closed or stowed position, the push button 40 is at the end of the track 34 nearest the hook remover 14, as shown in FIG. 5. In this position, as shown in FIG. 8, the bottom end of the rod 46 with the larger diameter is positioned in the rounded end of the bottom plate 30 of handle insert 24. Because the bottom portion of the rod 46 is too large to move within the elongated portion of the slot of the bottom plate 30, the rod 46 (and the other components of the slidable needle assembly 26) are locked in place in the stowed position.

When the vent needle 20 is needed, the fisherman pushes down on the thumb press 44, which causes the spring to compress and the rod 46 to move downward. In this regard, the rod 46 extends further downward through the bottom of the connector 38. The rod 46 moves downward until the larger-diameter bottom end of the rod 46 is entirely below the rounded end of the bottom plate 30, as shown in FIG. 7. Because the bottom end of the rod 46 is no longer restricted from movement by the bottom plate 30, the fisherman can now slide the rod 46 along the length of the track 34 by sliding the thumb press 44 until the rod reaches the end of the track 34, which is the end of the slots 32. As the rod is being slid towards the end of the handle, the vent needle 20 that is connected to the connector 38 is pushed through an opening in the end plate 42. Once the rod reaches the end of the track 34, the fisherman may remove the downward pressure on the thumb press 44. This causes the spring 48 to decompress and the rod 46 to move upward. As a result, the larger-diameter bottom end of the rod 46 pops into the rounded end of the bottom plate 30, as shown in FIG. 6. Because the bottom end of the rod 46 is too large to move within the elongated portion of the slot of the bottom plate 30, the rod 46 (and the other components of the slidable needle assembly 26) are locked in place in the open position.

The vent needle 20 may also be moved back to the closed or stowed position in the handle 12 when the needle is no longer being used. As shown in FIG. 6, when the vent needle 20 is in the open position, the push button 40 is at the end of the track 34 farthest from the hook remover 14. In this position, the bottom end of the rod 46 with the larger diameter is positioned in the rounded end of the bottom plate 30 of handle insert 24. Because the bottom end of the rod 46 is too large to move within the elongated portion of the slot of the bottom plate 30, the rod 46 (and the other components of the slidable needle assembly 26) are locked in place in the open position. When the vent needle 20 is no longer needed, the fisherman pushes down on the thumb press 44, which causes the spring to compress and the rod 46 to move downward. In this regard, the rod 46 extends further downward through the bottom of the connector 38. The rod 46 moves downward until the larger-diameter bottom end of the rod 46 is entirely below the rounded end of the bottom plate 30. Because the bottom portion of the rod 46 is no longer restricted from movement by the bottom plate 30 as shown in FIG. 7, the fisherman can now slide the rod 46 along the length of the track 34 by sliding the thumb press 44 until the rod reaches the end of the track 34, which is the end of the slots 32. As the rod is being slid towards the hook remover, the length of the vent needle 20 that is exposed through opening in the end plate 42 is reduced. Once the rod reaches the end of the track 34, the fisherman may remove the downward pressure on the thumb press 44. This causes the spring 48 to decompress and the rod 46 to move upward. As a result, the larger-diameter bottom end of the rod 46 pops into the rounded end of the bottom plate 30, as shown in FIG. 8. Because the bottom end of the rod 46 is too large to move within the elongated portion of the slot of the bottom plate 30, the rod 46 (and the other components of the slidable needle assembly 26) are locked in place in the stowed or closed position.

In use, the vent needle 20 of the vent needle assembly 18 is used by the fisherman to release or vent gases out of the swim bladder of a caught fish 36. As shown in FIG. 14, with the vent needle 20 in the open position, the fisherman punctures the swim bladder of the fish 36, which allows accumulated gases to be released from the swim bladder. After the swim bladder is punctured by the needle 20, the fisherman may place the fish back into the water to swim freely.

The present invention has been described with reference to certain preferred and alternative embodiments that are intended to be exemplary only and not limiting to the full scope of the present invention as set forth in the appended claims.

We claim:

1. A fishing hook remover and vent tool comprising:
a handle having a first end and a second end;
a hook remover connected to said first end of said handle;
a vent needle, wherein said vent needle is slidable in and out of said second end of said handle; and
a vent needle assembly, wherein said vent needle assembly comprises a handle insert positioned in an internal compartment of said handle and a slidable needle assembly positioned in an interior of said handle insert, wherein said slidable needle assembly comprises said vent needle, wherein said slidable needle assembly is operable to manually slide said vent needle in and out of said second end of said handle.

2. The fishing hook remover and vent tool of claim 1, wherein said slidable needle assembly further comprises a connector and a push button, wherein said vent needle and said push button are connected to said connector.

3. The fishing hook remover and vent tool of claim 2, wherein said push button comprises a thumb press, a rod, and a spring, wherein said spring surrounds said rod and said thumb press is connected to a top of said rod.

4. The fishing hook remover and vent tool of claim 1, wherein said handle insert comprises a top plate with a top slot and a bottom plate with a bottom slot.

5. The fishing hook remover and vent tool of claim 4, wherein said top slot and said bottom slot are aligned and form a track, wherein said slidable needle assembly is slidable in said track.

6. A fishing hook remover and vent tool comprising:
a handle having a first end and a second end;
a hook remover connected to said first end of said handle; and
a vent needle assembly, wherein said vent needle assembly comprises a handle insert positioned in an internal compartment of said handle and a slidable needle assembly positioned in an interior of said handle insert, wherein said slidable needle assembly comprises a vent needle, wherein said vent needle is slidable in and out of said second end of said handle.

7. The fishing hook remover and vent tool of claim 6, wherein said slidable needle assembly further comprises a connector and a push button, wherein said vent needle and said push button are connected to said connector.

8. The fishing hook remover and vent tool of claim 7, wherein said push button comprises a thumb press, a rod, and a spring, wherein said spring surrounds said rod and said thumb press is connected to a top of said rod.

9. The fishing hook remover and vent tool of claim 8, wherein said handle insert comprises a top plate with a top slot and a bottom plate with a bottom slot, wherein said bottom slot is elongated with a first rounded end and a second rounded end.

10. The fishing hook remover and vent tool of claim 9, wherein said top slot and said bottom slot are aligned and form a track, wherein said slidable needle assembly is slidable in said track when a bottom end of said rod extends below said bottom slot.

11. The fishing hook remover and vent tool of claim 10, wherein said vent needle is locked in position when said bottom end of said rod is positioned in said first rounded end or said second rounded end of said bottom slot.

12. The fishing hook remover and vent tool of claim 7, wherein said push button is configured to manually slide said vent needle in and out of said second end of said handle.

13. The fishing hook remover and vent tool of claim 7, wherein said rod is slidable in said connector.

* * * * *